United States Patent [19]
Weaver et al.

[11] Patent Number: 5,995,487
[45] Date of Patent: Nov. 30, 1999

[54] METHOD AND APPARATUS FOR PROVIDING SUBSCRIBERS WITH UNGUARANTEED BANDWIDTH CONNECTIONS WHEREIN SUBSCRIBERS ARE ALERTED BY ENCODED MESSAGES OR A WARNING TONE

[75] Inventors: Philip A. Weaver, Plano; Christopher Lorenzo, Richardson, both of Tex.

[73] Assignee: Northern Telecom Limited, Montreal, Canada

[21] Appl. No.: 08/907,342

[22] Filed: Aug. 6, 1997

[51] Int. Cl.⁶ .................. H04J 1/16; H04J 3/14; H04L 1/00; H04L 12/26
[52] U.S. Cl. .................. 370/230; 370/395; 370/463
[58] Field of Search .................. 370/389, 391, 370/392, 395, 396, 397, 399, 463, 400, 412, 414, 418, 230, 232.5, 437, 410, 522, 431

[56] References Cited

U.S. PATENT DOCUMENTS

| | | |
|---|---|---|
| 5,267,232 | 11/1993 | Katsube et al. . |
| 5,392,280 | 2/1995 | Zheng ........................ 370/60 |
| 5,504,744 | 4/1996 | Adams et al. ........................ 370/60.1 |
| 5,592,476 | 1/1997 | Calamvokis et al. .................. 370/390 |
| 5,594,717 | 1/1997 | Watanabe et al. . |
| 5,633,861 | 5/1997 | Hanson et al. ........................ 370/232 |
| 5,696,764 | 12/1997 | Soumiya et al. ........................ 370/395 |
| 5,784,358 | 7/1998 | Smith et al. ........................ 370/230 |
| 5,844,906 | 12/1998 | Khelghatti ........................ 370/474 |
| 5,889,779 | 3/1999 | Lincoln ........................ 370/398 |

OTHER PUBLICATIONS

IEEE Communications Magazine, May 1997, Gelenbe et al., *Bandwidth Allocation and Call Admission Control in High–Speed Networks*, pp. 122–129.

*Primary Examiner*—Douglas W. Olms
*Assistant Examiner*—David R Vincent
*Attorney, Agent, or Firm*—Haynes and Boone, L.L.P.

[57] ABSTRACT

Method and apparatus for enhancing the ability of a subscriber to connect to a carrier network by enabling the service provider to indicate to the subscriber when a requested connection to the carrier network would utilize unguaranteed bandwidth and, absent objection by the subscriber, to complete the requested connection utilizing the unguaranteed bandwidth. Upon receipt of a request for set-up of a call of an indicated bandwidth, the service provider will acknowledge the call set-up request. The service provider will then issue a call proceeding message to indicate that the requested connection is being arranged. The call proceeding message will contain an unguaranteed bandwidth indicator if the carrier network cannot guarantee the requested bandwidth. If a cancellation of the call request is not received in response to the unguaranteed bandwidth indicator, the call will be completed.

24 Claims, 2 Drawing Sheets

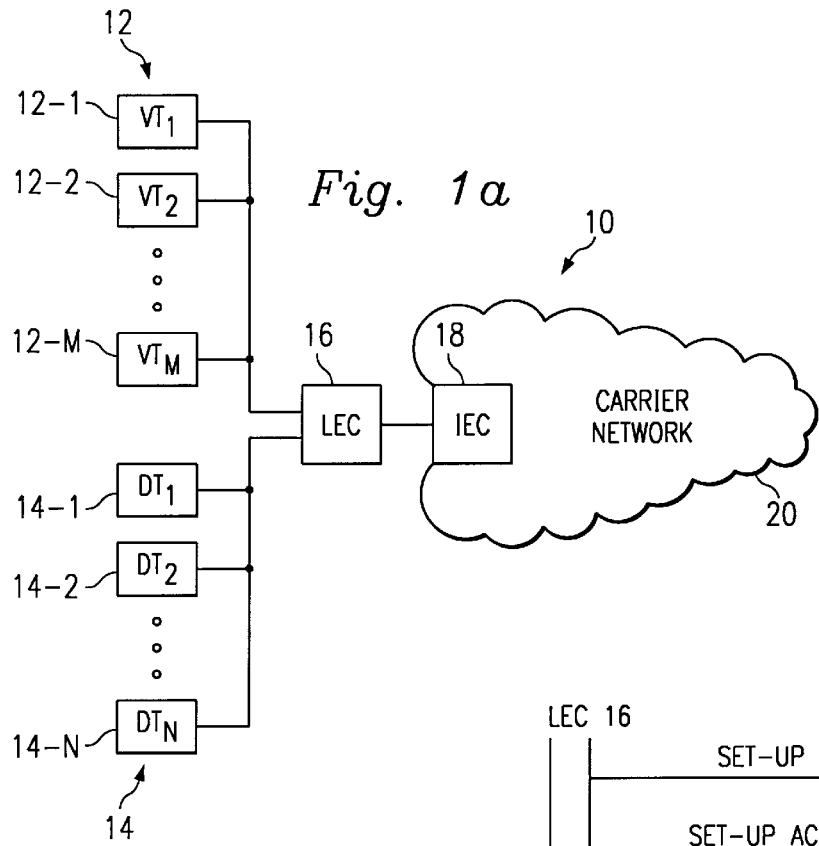
Fig. 1a
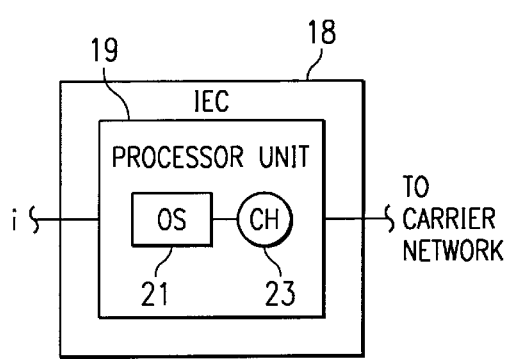
Fig. 1b
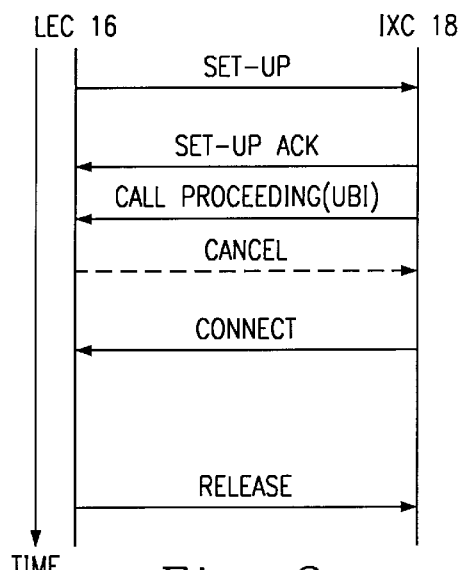
Fig. 3
Fig. 4
| BITS | | | | | | | |
|---|---|---|---|---|---|---|---|
| 8 | 7 | 6 | 5 | 4 | 3 | 2 | 1 |
| MESSAGE TYPE | | | | | | | |
| 1 | SPARE | | FLAG | SPARE | SPARE | ACTION INDICATOR | |

METHOD AND APPARATUS FOR PROVIDING SUBSCRIBERS WITH UNGUARANTEED BANDWIDTH CONNECTIONS WHEREIN SUBSCRIBERS ARE ALERTED BY ENCODED MESSAGES OR A WARNING TONE

TECHNICAL FIELD

The invention relates generally to call acceptance procedures for carrier networks and, more particularly, to a method and system for enhancing interconnection capacity for subscribers to the carrier network by enabling the service provider to notify subscribers when calls are to be completed using unguaranteed bandwidth.

BACKGROUND OF THE INVENTION

Generally speaking, bandwidth is the range of frequencies that a communications system, for example, a carrier network, is capable of carrying along its transmission medium. As each communication channel provided by the carrier network consumes a portion of the network's bandwidth, the bandwidth of the carrier network limits the number of communication channels which it can provide to its subscribers.

Different types of communications require different bandwidths. For example, one video channel requires approximately the same bandwidth as 1,200 voice telephone channels. In order to provide a single system capable of carrying the various types of communications, carrier networks are gradually evolving towards architectures such as asynchronous transfer mode (or "ATM") which will provide variable bandwidth to subscribers. It is contemplated that such networks will be particularly well suited for transmission of various types of media—voice, data, image and video—each requiring a different amount of bandwidth to complete the transmission.

An important concept in ATM is Quality of Service (or "QoS"). QoS defines the standards to which an ATM provider will adhere to when providing service to a subscriber. Based upon its planned usage of the ATM network, a subscriber will enter into a traffic contract with a service provider for a specific amount of bandwidth. Among other things, QoS assures the subscriber that the contracted bandwidth will be available for data transfers at a specified bit rate. Due to the increased cost thereof, a subscriber will rarely contract for bandwidth in excess of their expected usage. Problems may arise, however, if the subscriber attempts to complete a call or other type of connection which, if completed, would result in the subscriber consuming bandwidth in excess of the amount to which he or she had previously contracted for. For example, a subscriber may contract for sufficient bandwidth to complete a single voice channel but then attempt to conduct a video conference. Most service providers do not permit the subscriber to consume excess bandwidth and would, therefore, reject any requested connection which would produce such a result. Such rejections are often based upon the fear that, if the request were accepted, the service provider would not be able to maintain the specified data rate for the connection, thereby resulting in the loss of one or more data calls.

SUMMARY OF THE INVENTION

The present invention, accordingly, provides a method for enhancing interconnection capacity for subscribers to carrier networks by enabling the service provider to indicate to subscribers when a requested connection to the carrier network would utilize bandwidth for which QoS cannot be guaranteed for the duration of the connection and, absent objection by the subscriber, to complete the requested connection utilizing the unguaranteed bandwidth. By using unguaranteed bandwidth to complete calls, the subscriber can complete additional connections and reduce connection charges by using lower grade connections while the service provider can generate additional revenue by completing calls using lower grade connections that would otherwise remain unused.

In one embodiment, the method enhances the ability of a service provider to interconnect subscribers with a carrier network by indicating, upon receipt of a request from a first subscriber for an excess bandwidth connection, that the availability of the bandwidth required to complete the requested connection cannot be guaranteed. If the first subscriber does not want to complete the connection using unguaranteed bandwidth, the first subscriber may cancel the request at any time before the call is completed. Unless canceled by the subscriber, the service provider completes the requested connection using unguaranteed bandwidth.

In another embodiment, the invention is of a method for handling call requests by a subscriber who contracts for access to a carrier network through a service provider. Upon receipt of a request for set-up of a call of an indicated bandwidth, the service provider will acknowledge the call setup request. The service provider will then issue a call proceeding message to indicate that the access carrier is arranging the requested connection. If the carrier network cannot guarantee the requested amount of bandwidth, the call proceeding message will contain an unguaranteed bandwidth indicator. In alternate aspects thereof, the unguaranteed bandwidth indicator may be a audible warning tone, an audible recorded announcement or an encoded message. If a cancellation of the call request is not received in response to the unguaranteed bandwidth indicator, the service provider will complete the call.

In still another embodiment, the invention is of an apparatus for providing access to a carrier network which includes a processing unit coupled to the carrier network and to a terminal operated by a subscriber. Residing in the processing unit is call handling software. In response to a call set-up request, the call handling software will transmit a message indicating unguaranteed bandwidth if the call set-up request contains a request for excess bandwidth and the carrier network has sufficient capacity to temporarily provide the excess bandwidth. In alternate aspects thereof, the processing unit may be part of a file server or a switch.

A technical advantage achieved by the invention is that both the carrier network and the service provider are able to more efficiently use their existing resources. This efficiency is achieved through the utilization of reserved bandwidth that is not in use to complete a lower grade connection, i.e., a connection which is subject to a possible loss in bandwidth.

BRIEF DESCRIPTION OF THE DRAWINGS

FIG. 1a is a block diagram which illustrates a telecommunications system embodying features of the present invention;

FIG. 1b is an expanded block diagram of the interexchange carrier illustrated in FIG. 1a;

FIG. 3 is a flow diagram of messages transmitted during the enhanced call establishment procedure of FIG. 2; and FIG. 4 is a block diagram of a call proceeding message type information element.

DESCRIPTION OF A PREFERRED EMBODIMENT

Figure 2:
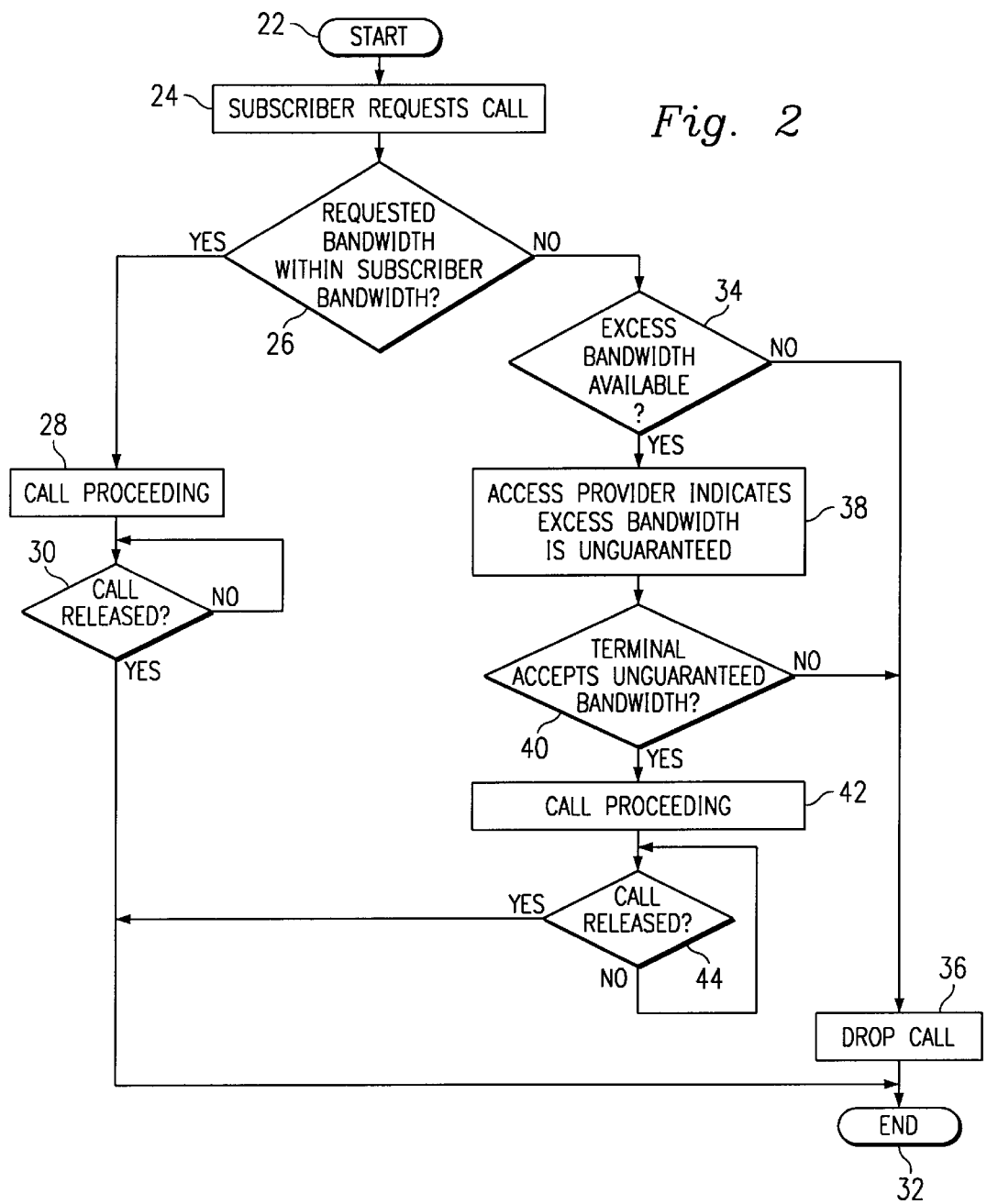
FIG. 2 is a flow chart of a method for enhancing call establishment capacity for a service provider to the carrier network of FIG. 1.

In the description to follow, bandwidth is referred to as either "guaranteed" or "unguaranteed." Generally, bandwidth for which a subscriber contracts is considered to be "guaranteed", i.e., barring a network or other type of system failure, the bandwidth will always be available for use by the subscriber. Furthermore, connections completed using guaranteed bandwidth will also meet all QoS standards, including data transfer rates, for the service provider. "Unguaranteed bandwidth", on the other hand, refers to bandwidth in excess of that for which the subscriber had previously contracted. Unguaranteed bandwidth exists only when the carrier network is underutilized, i.e., a portion of the carrier network's bandwidth is unused and is characterized by its potential for data loss, for example, by dropping data cells, at any time during the connection.

Turning now to the drawings, in FIG. 1a, the reference numeral 10 designates a communications or other type of data transfer network. The public switched telephone network (or "PSTN") is but one example of such a communications network. The communications network 10 includes a series of terminals where subscribers may access the network, for example, by requesting a call or other type of connection to a specified destination, typically, another terminal. As disclosed herein, the terminals include a voice network comprised of a plurality of voice terminals 12-1 through 12-M and a data network comprised of a plurality of data terminals 14-1 through 14-N. For example, telephones may be used as the voice terminals 12-1 through 12-N while multimedia computers may be used as the data terminals 14-1 through 14-N. While only voice and data terminals are disclosed herein, it is contemplated that other types of devices may be used as terminals. Furthermore, while FIG. 1 illustrates the voice and data terminals 12-1 through 12-M and 14-1 through 14-N residing on separate voice and data networks 12 and 14, respectively, it is contemplated that, in one embodiment of the invention, both types of terminals may reside on a single, fully integrated communications network.

The voice and data networks 12 and 14 are respectively coupled to a local exchange carrier (or "LEC") 16, a common carrier that provides local service for the voice and data terminals 12-1 through 12-M and 14-1 through 14-N. For example, the LEC 16 would handle a connection between the voice terminal 12-1 and the voice terminal 12-2. The LEC 16 is coupled to an inter-exchange carrier (or "IEC") 18 of a carrier network 20. The IEC 18 acts as an access node to the remainder of the carrier network 20 for terminals coupled to the LEC 16. When a voice or data terminal, for example, the voice terminal 12-1, seeks to complete a call to a terminal not coupled to the LEC 16, the connection to that terminal must go through the carrier network 20.

The bandwidth of the carrier network 20 creates a physical limitation in both the number and type of communication connections which may be completed therethrough. A "service provider" is an entity through which subscribers may reserve portions of the available bandwidth of the carrier network 20. Generally, the IEC 18 operates as a service provider for the carrier network 20. However, other entities, for example, the LEC 16, may function as a service provider for the carrier network 20 even though that entity may not be directly responsible for physically connecting the subscriber with the carrier network 20. For example, the LEC 16 may reserve part of the available bandwidth for the carrier network 20 and then re-sell a portion thereof to a subscriber operating the voice terminal 12-1. Accordingly, while in the embodiment disclosed herein, the IEC 18 acts as a service provider to the carrier network 20, the invention is equally suitable for use in configurations where other entities act as the service provider to the carrier network 20.

Referring next to FIG. 1b, the IEC 18 will now be more fully described. As previously stated, the IEC 18 provides connections between terminals coupled to the LEC 16 and the remainder of the carrier network 20. Thus, depending on the specific terminals and carrier network, the IEC 18 may be a file server, a switch or other type of equipment capable of providing connections. Regardless of type, the IEC 18 will include a processor unit 19 coupled to the LEC 16 and the carrier network 20. The processing unit 19 supports an operating system (or "OS") 21 capable of executing call handling (or "CH") software 23 which resides within the processor unit 18. Of course, the IEC 18 also includes a variety of other devices which have been omitted from FIG. 1b for ease of illustration.

Referring next to FIG. 2, a method of providing enhance interconnection capacity for a subscriber to a carrier network in accordance with the teachings of the present invention will now be described in greater detail. In the description to follow, terminals are considered to be subscriber specific, i.e., information as to the subscriber's profile resides within the terminal used thereby. It is contemplated, however, that, in one embodiment of the invention, the terminals may be non-subscriber specific and the subscriber may provide his or her profile to the terminal before initiating a request for call set-up, for example, by use of a subscriber-specific user interface module (or "UIM").

The method starts at step 22 and, at step 24, a subscriber uses a terminal, for example, the voice terminal 12-1, to initiate a request for set-up of a call (or other type of connection) having a selected bandwidth. Generally, the selected bandwidth will be based upon the bandwidth needs for the type of connection requested by the subscribers. Proceeding to step 26, a determination is made as to whether the selected bandwidth exceeds the bandwidth to which the subscriber had previously contracted with the IEC 18. In the embodiment of the invention disclosed herein, the voice terminal 12-1 indicates to the LEC 16 as to whether the request for call setup contains a request for bandwidth in excess of the contracted bandwidth. Alternately, the excess bandwidth determination may be made by the subscriber or by the voice terminal. The subscriber would do so by simply indicating, in the initial request, that excess bandwidth has been requested. The voice terminal 12, on the other hand, would need to perform a comparison of the requested bandwidth to the contracted bandwidth. In an alternate embodiment of the invention, however, the determination as to whether the call request contains a request for excess bandwidth is performed elsewhere, for example, by the IEC 18.

If it is determined that the amount of bandwidth requested by the subscriber is within that subscriber's guaranteed bandwidth, i.e., the bandwidth which the subscriber had previously contracted for, the method continues on to step 28 where the call proceeds in accordance with conventional call establishment protocols. The call will continue until released at step 30, for example, by the subscriber terminating the connection. Upon release of the call, the method ends at step 32.

Returning to step 26, if the requested bandwidth exceeds the guaranteed bandwidth for the subscriber, the method proceeds to step 34 where the IEC 18 determines if excess bandwidth is available. If no excess bandwidth is available, the method proceeds to step 36 where the IEC 18 drops the call request before the completion thereof. Having dropped the call request, the method ends at step 32.

Returning to step 34, if, however, the IEC 18 determines that unused bandwidth is available, the method continues on to step 38 where the IEC 18 indicates to the subscriber that the requested excess bandwidth is available for use by the subscriber but that the bandwidth is unguaranteed. At step 40, the subscriber may either accept or reject the offer, by the IEC 18, to proceed with the requested call using unguaranteed bandwidth. It is contemplated that acceptance and/or rejection of the unguaranteed bandwidth call may be achieved in a variety of manners. Preferably, the IEC 18 advises the subscriber that it is able to complete the call but that the bandwidth of the call cannot be guaranteed. The subscriber is then allowed a short time period during which the call may be rejected, for example, by terminating the call request by hanging up or otherwise breaking connection with the IEC 18. If the subscriber has not rejected the call within either a designated time period, for example, five seconds, or within the time required to complete the requested connection, the unguaranteed bandwidth call is accepted by default. In an alternate embodiment of the invention, the method may be configured so that, upon receiving an unguaranteed bandwidth indication (or "UBI"), the subscriber must accept the unguaranteed bandwidth call, for example, by return message, or the call would default to disconnection after expiration of a designated time period, for example, 5 seconds.

Regardless of whether the method defaults to acceptance of the unguaranteed bandwidth call or requires the subscriber to affirmatively accept the call, upon acceptance of the unguaranteed bandwidth call, the method continues on to step 42 where the call, allocated the requested unguaranteed bandwidth by the carrier network 20, proceeds. Once connected, the call continues until released at step 44, again, for example, by disconnection of the call by the subscriber. The method then ends at step 32.

Referring next to FIG. 3, the messages exchanged between the LEC 16 and the IEC 18 during a connection between the voice terminal 12-1 and the carrier network 20 completed using unguaranteed bandwidth will now be described. The call is initiated by the LEC 16 issuing a call set-up request to the IEC 18. The call set-up request includes an indication of the bandwidth requested by the subscriber. Preferably, the call set-up request will also indicate whether the request is for excess bandwidth. After reviewing the available resources and determining that there is sufficient bandwidth available to complete the requested call, the IEC 18 issues a call proceeding message. In addition to indicating that the call is proceeding, the message will also indicate whether the bandwidth to be used to complete the call will be unguaranteed. The IEC 18 will proceed with the necessary arrangements and, using a call connected message, will inform the LEC 16 when the call is completed. If the subscriber does not wish to continue with the call using unguaranteed bandwidth, at any time between receipt of the call proceeding message and the call connected message, the subscriber may choose to cancel the call by disconnecting. Once connected, the call will continue until released by the LEC 16.

Referring next to FIG. 4, the transmission of a UBI to terminals forming part of the voice network 12 or the data network 14 will now be described. As previously discussed, UBIs may be transmitted to terminals using either an audible tone, an audible announcement or an encoded message. More specifically, for the voice network 12, the UBI may be transmitted by a tone configured in accordance with an existing or future tone standard. For example, a tone similar to Nortel's Expensive Route Warning Tone (or "ERWT"), which is comprised of three 250 msec bursts of a 440 Hz tone at −13 dBm in a 250 msec on/off cadence, will be suitable for the uses contemplated herein. For the data network 14, the UBI may either be encoded within an existing message or, if desired, as a separate message. For example, FIG. 4 shows the present format of a portion of a "Call Proceeding" message which is used by carrier networks to indicate to the user that the requested call set-up has been accepted and no more call setup information will be accepted by the IEC 18. The call proceeding message is compressed of six information elements (or "IEs")—a 1 octet protocol discriminator, a 4 octet call reference, a 2 octet message type (illustrated in FIG. 4 as IE 52), a 2 octet message length, a 4 to 9 octet connection identifier and a 4 to 5 octet notification indicator. As may now be seen, both bits 3 and 4 of the message type IE 52 are spare bits and either of these may be used to encode a UBI which may be, for example, a single bit set high. When a data terminal, for example, the data terminal 14-1, receives the call proceeding message, the terminal will examine the contents of the selected bit of the IE 52 to determine whether a UBI condition exists.

Although illustrative embodiments of the invention have been shown and described, other modifications, changes, and substitutions are intended in the foregoing disclosure. For example, rather than only providing unguaranteed bandwidth connections to subscribers requesting bandwidth in excess of contracted bandwidth, the invention is equally suitable for providing service to non-subscribers, i.e., prospective users of the carrier network that have not contracted for any portion of the carrier network's bandwidth. By expanding the class of users to which temporarily unused bandwidth may be sold, it is contemplated that the additional revenue which may be generated by practicing the invention will be still further enhanced. Accordingly, it is appropriate that the appended claims be construed broadly and in a manner consistent with the scope of the invention.

What is claimed is:

1. For a subscriber who contracts with a service provider which provides a guaranteed amount of bandwidth when interconnecting said subscriber with a carrier network, a method of providing enhanced interconnection capacity to said subscriber, comprising the steps of:

receiving, from said subscriber, a request for connection with said carrier network at a bandwidth in excess of said guaranteed amount of bandwidth;

determining if said bandwidth requested by said subscriber is available;

providing, to said subscriber, said requested connection with said carrier network, said bandwidth of said requested connection provided to said subscriber being unguaranteed; and indicating, to said subscriber, that said bandwidth of said requested connection is unguaranteed by encoding an unguaranteed bandwidth indicator into a message transmitted to said subscriber upon acceptance of said requested connection by said carrier network.

2. The method of claim 1 and further comprising the step of:

receiving, from said subscriber, an acceptance of said requested connection;

upon receipt of said acceptance, said requested connection being provided to said subscriber.

3. For a subscriber who contracts with a service provider which provides a guaranteed amount of bandwidth when interconnecting said subscriber with a carrier network, a method of providing enhanced interconnection capacity to said subscriber, comprising the steps of:

receiving, from said subscriber, a request for connection with said carrier network at a bandwidth in excess of said guaranteed amount of bandwidth;

determining if said bandwidth requested by said subscriber is available;

providing, to said subscriber, said requested connection with said carrier network, said bandwidth of said requested connection provided to said subscriber being unguaranteed; and indicating, to said subscriber, that said bandwidth of said requested connection is unguaranteed; and receiving, from said subscriber, an acceptance of said requested connection;

upon receipt of said acceptance, said requested connection being provided to said subscriber;

wherein the step of indicating that said bandwidth of said requested connection is unguaranteed further comprises the step of generating a warning tone audible to said subscriber.

4. For a subscriber who contracts with a service provider which provides a guaranteed amount of bandwidth when interconnecting said subscriber with a carrier network, a method of providing enhanced interconnection capacity to said subscriber, comprising the steps of:

receiving, from said subscriber, a request for connection with said carrier network at a bandwidth in excess of said guaranteed amount of bandwidth;

determining if said bandwidth requested by said subscriber is available;

providing, to said subscriber, said requested connection with said carrier network, said bandwidth of said requested connection provided to said subscriber being unguaranteed;

indicating, to said subscriber, that said bandwidth of said requested connection is unguaranteed; and receiving, from said subscriber, an acceptance of said requested connection;

upon receipt of said acceptance, said requested connection being provided to said subscriber;

wherein the step of indicating that said bandwidth of said requested connection is unguaranteed further comprises the step of generating a recorded announcement audible to said subscriber.

5. The method of claim 2 wherein the step of receiving, from said subscriber, an acceptance of said requested connection further comprises the step of determining that a failure of said subscriber to disconnect after receiving said indication that said bandwidth is unguaranteed and before said requested connection is completed is said acceptance of said requested connection.

6. For a subscriber who contracts with a service provider which provides a guaranteed amount of bandwidth when interconnecting said subscriber with a carrier network, a method of providing enhanced interconnection capacity to said subscriber, comprising the steps of:

receiving, from said subscriber, a request for connection with said carrier network at a bandwidth in excess of said guaranteed amount of bandwidth;

determining if said bandwidth requested by said subscriber is available;

providing, to said subscriber, said requested connection with said carrier network, said bandwidth of said requested connection provided to said subscriber being unguaranteed;

indicating, to said subscriber, that said bandwidth of said requested connection is unguaranteed; and receiving, from said subscriber, an acceptance of said requested connection;

wherein, upon receipt of said acceptance, said requested connection being provided to said subscriber; and wherein the step of indicating that said bandwidth of said requested connection is unguaranteed further comprises the step of encoding an unguaranteed bandwidth indicator into a message transmitted to said subscriber upon acceptance of said requested connection by said carrier network.

7. The method of claim 6 wherein said unguaranteed bandwidth indicator is encoded into a call proceeding message.

8. The method of claim 6 wherein said unguaranteed bandwidth indicator is encoded into a message type information element of a call proceeding message.

9. A method for handling a call request issued by a subscriber to a service provider for connection to a carrier network, comprising the steps of:

receiving a request for set-up of a call having a bandwidth;

acknowledging said request for call set-up;

determining if said carrier network can guarantee said bandwidth of said call;

issuing a call proceeding message, said call proceeding message containing an unguaranteed bandwidth indicator ("UBI") if said carrier network cannot guarantee said bandwidth of said call; and if a cancellation of said call request is not received in response to issuance of said UBI, completing said call.

10. The method of claim 9 wherein said subscriber originates said request for call set-up.

11. The method of claim 10 wherein said request for call set-up indicates whether said bandwidth exceeds a bandwidth level previously guaranteed to said subscriber.

12. A method for handling a call request issued by a subscriber to a service provider for connection to a carrier network, comprising the steps of:

receiving a request for set-up of a call having a bandwidth:

acknowledging said request for call set-up;

issuing a call proceeding message, said call proceeding message containing a warning tone audible to said subscriber if said carrier network cannot guarantee said bandwidth of said call; and if a cancellation of said call request is not received in response to issuance of said UBI, completing said call.

13. A method for handling a call request issued by a subscriber to a service provider for connection to a carrier network, comprising the steps of:

receiving a request for set-up of a call having a bandwidth;

acknowledging said request for call set-up;

issuing a call proceeding message, said call proceeding message containing a recorded announcement audible to said subscriber if said carrier network cannot guarantee said bandwidth of said call; and if a cancellation of said call request is not received in response to issuance of said UBI, completing said call.

14. The method of claim 11 wherein said UBI is encoded in a message transmitted to said subscriber upon acceptance of said request for call set-up.

15. An apparatus for providing access to a carrier network comprising:

a processing unit which supports an operating system, said processing unit coupled to a carrier network and to a terminal operated by a subscriber; and call handling software residing in said processing unit and executable by said operating system, said call handling software transmitting, in response to a call set-up request issued by said terminal and upon acceptance of said call set-up request by said carrier network, a message having an unguaranteed bandwidth indicator encoded therein which indicates unguaranteed bandwidth if said call set-up request contains a request, by said subscriber operating said terminal, for excess bandwidth and said carrier network has sufficient capacity to temporarily provide said excess bandwidth.

16. The apparatus of claim 15 wherein said processor unit is part of a file server.

17. The apparatus of claim 15 wherein said processor unit is part of a switch.

18. The method of claim 1 wherein said unguaranteed bandwidth indicator is encoded into a call proceeding message.

19. The method of claim 1 wherein said unguaranteed bandwidth indicator is encoded into a message type information element of a call proceeding message.

20. For a subscriber who contracts with a service provider which provides a guaranteed amount of bandwidth when interconnecting said subscriber with a carrier network, a method of providing enhanced interconnection capacity to said subscriber, comprising the steps of:

receiving, from said subscriber, a request for connection with said carrier network at a bandwidth in excess of said guaranteed amount of bandwidth;

determining if said bandwidth requested by said subscriber is available;

providing, to said subscriber, said requested connection with said carrier network, said bandwidth of said requested connection provided to said subscriber being unguaranteed; and issuing a call proceeding message to said subscriber, said call proceeding message containing an unguaranteed bandwidth indicator ("UBI") if said carrier network cannot guarantee said bandwidth of said call.

21. The method of claim 20 wherein said request for connection indicates whether said requested bandwidth exceeds said guaranteed amount of bandwidth.

22. The method of claim 20 and further comprising the step of:

receiving, from said subscriber, an acceptance of said requested connection;

upon receipt of said acceptance, said requested connection being provided to said subscriber.

23. The method of claim 22 wherein the step of receiving, from said subscriber, an acceptance of said requested connection further comprises the step of determining that a failure of said subscriber to disconnect after receiving said call proceeding message containing said UBI and before said requested connection is completed is said acceptance of said requested connection.

24. The apparatus of claim 15 wherein said message is a call proceeding message.

* * * * *